US008804555B2

(12) United States Patent
Turk et al.

(10) Patent No.: US 8,804,555 B2
(45) Date of Patent: Aug. 12, 2014

(54) INTERFERENCE DETECTION IN MOBILE TELECOMMUNICATIONS NETWORKS

(75) Inventors: John Turk, Newbury (GB); Roger Beck, Newbury (GB); Ashley Mills, Newbury (GB)

(73) Assignee: Vodafone IP Licensing Limited, Newbury (GB)

( * ) Notice: Subject to any disclaimer, the term of this patent is extended or adjusted under 35 U.S.C. 154(b) by 49 days.

(21) Appl. No.: 13/329,634

(22) Filed: Dec. 19, 2011

(65) Prior Publication Data

US 2012/0155307 A1 Jun. 21, 2012

(30) Foreign Application Priority Data

Dec. 17, 2010 (GB) .................................. 1021464.1

(51) Int. Cl.
*G08C 15/00* (2006.01)
*H04W 52/02* (2009.01)

(52) U.S. Cl.
CPC ................................ *H04W 52/0238* (2013.01)
USPC ......................................... 370/252; 455/423

(58) Field of Classification Search
CPC ............ H04W 72/082; H04W 72/085; H04W 72/087; H04W 52/243; H04W 52/0225; H04W 52/0229; H04W 52/0238
USPC .......... 455/423, 296; 370/208, 241, 252, 310, 370/328, 329
See application file for complete search history.

(56) References Cited

U.S. PATENT DOCUMENTS

| 6,175,734 | B1 * | 1/2001 | Desgagne et al. | ............. | 455/437 |
| 6,259,922 | B1 * | 7/2001 | Benveniste | ................ | 455/452.1 |
| 6,993,002 | B2 * | 1/2006 | Pan et al. | ....................... | 370/335 |
| 2005/0007975 | A1 * | 1/2005 | Shen et al. | ..................... | 370/320 |
| 2005/0286409 | A1 * | 12/2005 | Yoon et al. | ..................... | 370/210 |
| 2007/0173261 | A1 * | 7/2007 | Priotti et al. | ................... | 455/450 |
| 2007/0217327 | A1 * | 9/2007 | Baggen et al. | ................ | 370/208 |
| 2008/0045227 | A1 | 2/2008 | Nagai | | |
| 2008/0057996 | A1 * | 3/2008 | Sung et al. | .................... | 455/522 |
| 2008/0233967 | A1 | 9/2008 | Montojo | | |

(Continued)

FOREIGN PATENT DOCUMENTS

| CN | 101588591 | 11/2009 |
| WO | 2010/076041 A1 | 7/2010 |

OTHER PUBLICATIONS

European Search Report issued for counterpart European Patent Application No. 11275162.3 dated Mar. 29, 2012.

(Continued)

*Primary Examiner* — Paul H. Masur
*Assistant Examiner* — Michael Phillips
(74) *Attorney, Agent, or Firm* — Kratz, Quintos & Hanson, LLP

(57) ABSTRACT

Disclosed is a method of identifying interference in a cellular telecommunications network including a plurality of cells controlled by a base stations 5, each cell serving a plurality of mobile devices 1 by radio link by using communication resources allocated to each of the mobile devices, the network having a frequency band allocated thereto. The method includes detecting radio quality within the frequency band at at least one of the cells to produce measurement values; and analyzing selected ones of the measurement values to determine if the selected measurement values indicate the presence of interference, wherein the selected measurement values exclude the measurement values relating to the communication resources allocated to each of the mobile devices served by the cell.

19 Claims, 13 Drawing Sheets

(56) References Cited

U.S. PATENT DOCUMENTS

| | | | |
|---|---|---|---|
| 2009/0279442 A1* | 11/2009 | Rave | 370/246 |
| 2009/0303900 A1* | 12/2009 | Cho et al. | 370/252 |
| 2010/0002595 A1 | 1/2010 | Iwamura | |
| 2010/0008282 A1* | 1/2010 | Bhattad et al. | 370/312 |
| 2010/0020771 A1* | 1/2010 | Ji et al. | 370/336 |
| 2010/0056153 A1 | 3/2010 | Attar | |
| 2010/0075689 A1* | 3/2010 | Uemura et al. | 455/452.1 |
| 2010/0099428 A1* | 4/2010 | Bhushan et al. | 455/452.1 |
| 2010/0128656 A1* | 5/2010 | Kim et al. | 370/316 |
| 2010/0165860 A1* | 7/2010 | Wigren | 370/252 |
| 2010/0178895 A1* | 7/2010 | Maeda et al. | 455/404.1 |
| 2010/0182903 A1* | 7/2010 | Palanki et al. | 370/225 |
| 2010/0197297 A1* | 8/2010 | Hong et al. | 455/424 |
| 2010/0272050 A1* | 10/2010 | Lim et al. | 370/329 |
| 2010/0273502 A1* | 10/2010 | Uemura et al. | 455/452.2 |
| 2010/0317339 A1* | 12/2010 | Koc | 455/424 |
| 2010/0322202 A1* | 12/2010 | Ohta | 370/336 |
| 2011/0021222 A1* | 1/2011 | Wigren | 455/501 |
| 2011/0110251 A1* | 5/2011 | Krishnamurthy et al. | 370/252 |
| 2011/0273997 A1* | 11/2011 | Sumasu et al. | 370/252 |
| 2011/0317613 A1* | 12/2011 | Gerstenberger et al. | 370/312 |
| 2012/0113844 A1* | 5/2012 | Krishnamurthy | 370/252 |
| 2012/0113961 A1* | 5/2012 | Krishnamurthy | 370/332 |
| 2013/0308485 A1* | 11/2013 | Krishnamurthy et al. | 370/252 |

OTHER PUBLICATIONS

UK Search Report issued for counterpart UK Patent Application No. 1021464.1 dated Apr. 19, 2011.

* cited by examiner

| Sub-band n | | | | |
|---|---|---|---|---|
| | ... | | | |
| Sub-band 3 | 15 | 11 | 13 | |
| Sub-band 2 | 12 | 12 | 8 | |
| Sub-band 1 | 9 | 10 | 10 | ... |
| | Subframe 1 | Subframe 2 | Subframe 3 | Subframe n |

FIG. 11

| Sub-band n | |
|---|---|
| | ... |
| Sub-band 3 | 320 |
| Sub-band 2 | 279 |
| Sub-band 1 | 307 |
| | All subframes |

FIG. 12

| All Sub-bands | 140 | 144 | 139 | ... | |
|---|---|---|---|---|---|
| | Subframe 1 | Subframe 2 | Subframe 3 | | Subframe n |

FIG. 13

INTERFERENCE DETECTION IN MOBILE TELECOMMUNICATIONS NETWORKS

TECHNICAL FIELD

The present invention relates to a method of identifying interference in a cellular telecommunications network including a plurality of cells, each of which serves a plurality of mobile devices by radio link by using communication resources allocated to each of the mobile devices, the network having a frequency band allocated thereto. The invention also relates to a corresponding apparatus.

BACKGROUND TO THE INVENTION

The present invention relates to telecommunications networks, and more particularly, but not exclusively, to developments in such networks suitable for adoption in 3GPP SAE/LTE or $4^{th}$ generation (4G) mobile or cellular telecommunications networks that will be implemented in the future. The invention may be applied to many types of multichannel communication systems.

It is anticipated that SAE/LTE and 4G networks may provide the following advantages, compared to these known networks:—
 1. Support interactive multimedia services: teleconferencing, wireless Internet, etc.
 2. Wider bandwidths, higher bit rates.
 3. Global mobility and service portability.
 4. Scalability of mobile networks.
and may be/have:—
 5. Entirely packet-switched networks.
 6. All network elements are digital.
 7. Higher bandwidths to provide multimedia services at lower cost.
 8. Tight network security.

A lot of work is being done to develop LTE intercell interference minimisation techniques. That work is concerned with reducing interference caused by neighbouring cells of the same network.

SUMMARY OF THE INVENTION

An object of embodiments of the present invention is to identify where interference comes from sources other than neighbouring cells of the same network.

The present invention provides a method of identifying interference in a cellular telecommunications network including a plurality of cells, each of which serves a plurality of mobile devices by radio link by using communication resources allocated to each of the mobile devices, the network having a frequency band allocated thereto, and the method including:
 detecting radio quality within the frequency band at least one of the cells to produce measurement values; and
 analysing selected ones of the measurement values to determine if the selected measurement values indicate the presence of interference, wherein the selected measurement values exclude the measurement values relating to the communication resources allocated to each of the mobile devices served by the cell.

The method of identifying interference in a cellular telecommunications network may, for example, be performed by hardware and/or a computer program.

The present invention also provides apparatus for identifying interference in a cellular telecommunications network including a plurality of cells, each of which serves a plurality of mobile devices by radio link by using communication resources allocated to each of the mobile devices, the network having a frequency band allocated thereto, the apparatus including:
 means operable to detect radio quality within the frequency band at least one of the cells to produce measurement values; and
 means operable to analyse selected ones of the measurement values to determine if the selected measurement values indicate the presence of interference, wherein the selected measurement values exclude the measurement values relating to the communication resources allocated to each of the mobile devices served by the cell.

The apparatus for identifying interference in a cellular telecommunications network may, for example, include a data processing apparatus adapted to provide the recited functionality or may be a data processing apparatus that runs a program containing instructions for providing the recited functionality.

The communication resources allocated to each mobile device may be allocated by a base station which controls the cell.

In a first embodiment, the radio quality comprises uplink received power at the cell.

In the first embodiment, the communication resources comprise respective frequency domain subcarriers, and the radio quality of the respective subcarriers is detected to produce ones of the measurement values for each of the subcarriers.

In the first embodiment, the selected measurement values exclude the measurement values relating to the subcarriers allocated to each of the mobile devices served by the cell, and optionally also the measurement values relating to the subcarriers allocated to selected mobile devices served by neighbouring ones of the cells (in the embodiment, such subcarriers allocated to selected mobile devices served by neighbouring ones of the cells are those with High Interference Indications).

In the first embodiment, the analysing step compares the selected measurement value relating to one of the communication resources with a representative value of the selected measurement values relating to others of the communication resources. The representative value may be the average of the selected measurement values relating to the others of the communication resources. For example, the analysing step may compare the maximum uplink received power of one subcarrier observed over a period of time, such as an hour or a week, with the average (e.g. arithmetical mean) of the maximum uplink received powers of all other subcarriers observed over the same period of time. If the maximum uplink received power of one subcarrier exceeds the average of all subcarriers by a significant amount (a threshold), then this is an indication that interference is occurring on that subcarrier.

In a second embodiment, the step of detecting radio quality comprises interpreting quality reports relating to downlink radio quality. The quality reports may comprise CQI (Channel Quality Indicator) reports or RSRP (Reference Signal Receive Power) reports.

In the second embodiment, the communication resources comprise respective frequency domain sub-bands and respective time domain subframes, and the radio quality of the respective sub-bands and subframes is detected to produce the measurement values for each of the sub-bands and subframes (a resource in the time and frequency domains).

In the second embodiment, the selected measurement values exclude the measurement values relating to the mobile devices served by the cell but located at an edge of the cell.

In the second embodiment, the analysing step may include detecting when there is a change in the frequency of occurrence of a particular one of the quality report values. For example, if the quality reports comprise CQI values, they will have a value of between 0 and 15. If the frequency at which a particular quality report value (or combination of quality report values) occurs for a given communication resource (in the time and/or frequency domain) changes significantly, this may indicate that interference is present.

The cellular telecommunications network may be an LTE network, and the cells may each be controlled by an eNodeB base station. However, although the invention is applicable to LTE networks the principles can be applied to other multi-channel communication systems.

The method may also include the step of analysing selected ones of the measurement values to identify the source of the interference—e.g. another LTE network, a faulty UE, TV transmitter, etc.

The method may also include the step of suspending use of resources to identify the source of the interference. This is referred to as active interference detection. If a cell suspends use of a particular resource for communication with any mobile device, and interference continues to occur, faulty operation of the cell and mobile device can be excluded as the source of interference.

The method may also include the step of removing the source of the interference, such as preventing a faulty mobile device from accessing the network, or contacting a TV transmitter operator to request adjustment of the transmitter.

Preferably detecting of radio quality within the frequency band at least one of the base stations to produce measurement values is performed over an extended period of time—such as an hour or a week. This allows typical values to be obtained, so that shorter term variations can subsequently be identified (and which are indicative of interference).

The method may also include performing the detecting and analysing steps for a plurality of the base stations, and comparing the performance of the base stations based on the analysis.

BRIEF DESCRIPTION OF THE DRAWINGS

For a better understanding of the present invention embodiments will now be described by way of example, with reference to the accompanying drawings, in which:

FIG. 11 shows a CQI measure table compiled for the CQI value of zero showing CQI measures for each sub-band and subframe;

FIG. 12 shows a CQI measure table compiled for the CQI value of zero showing CQI measures for each sub-band; and FIG. 13 shows a CQI measure table compiled for the CQI value of zero showing CQI measures for each subframe.

DETAILED DESCRIPTION OF EMBODIMENT OF THE INVENTION

Overview of SAE/LTE Network

Figure 1:
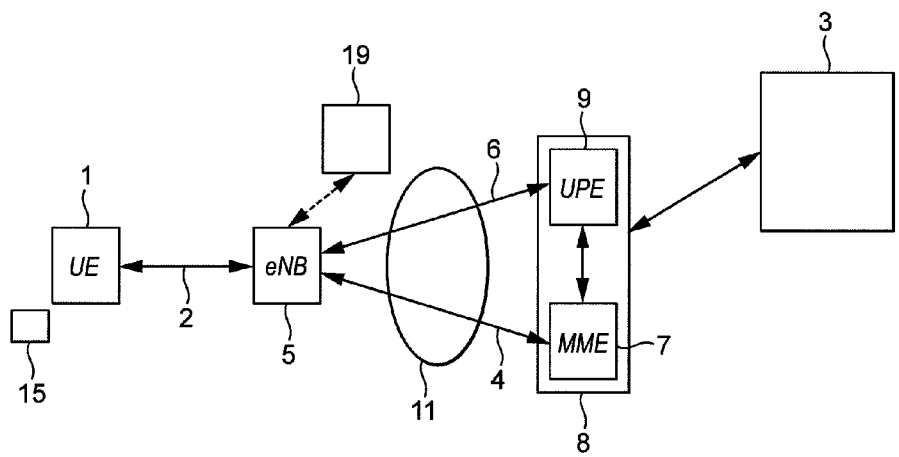
FIG. 1 shows the main elements of an SAE/LTE 4G network.

FIG. 1 shows schematically the logical elements of a SAE/LTE cellular telecommunications network. Mobile terminal (UE) 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises an eNodeB (or eNB) 5. An eNodeB 5 performs functions generally similar to those performed by the NodeB and the radio network controller (RNC) of a 3G network. In practice there will be a multiplicity of eNodeBs 5, each serving a particular area or "cells". Each eNodeB is coupled to one or more antenna devices. The eNodeB and antenna device form a cell site. The cell site provides radio coverage to a plurality of cells, e.g. three.

Signalling in a mobile telecommunications network can be considered to be separated into "control plane" signalling and "user plane signalling". The control plane performs the required signalling, and includes the relevant application protocol and signalling bearer for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

A mobility management entity (MME) 7 provides equivalent functions to the control plane functions of the SGSN and GGSN from the 3G architecture (Release-6). The MME handles security key management. The MME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3 RNC and the user plane part of the 3G GGSN. Communications between the eNodeB 5 are transmitted to the UPE 7 via the S1-u Interface 6. The known 3GPP authentication procedure may be re-used in the SAE/LTE architecture shown, between the terminal 1/UE and the MME 7.

It should be noted that, although in FIG. 1 the MME 7 and UPE 9 are shown as separate logical entities they may exist as a single physical node of the telecommunications network in gateway aGW 8.

Data are transmitted between the eNodeB 5 and the MME 7 and UPE 9 via the IP transport network 11.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated by a SIM 15.

The network also performs O&M (Operations & Maintenance). This term refers to the processes and functions used in managing a network or element within a network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Typically a UE will report the following measurements to the network: CQI, serving cell RSRP and neighbour cell RSRP.

Reference Signal Receive Power, RSRP, is a measurement (in dBm) made by the UE of a reference signal transmitted from a cell. A higher RSRP value indicates a higher received signal power, and thus a lower pathloss to the cell. UEs measure RSRP values for the serving cell (i.e. the cell on which they are currently camped) and neighbouring cells. The RSRP values measured by each UE may be transmitted to its serving cell.

The RSRP value for a particular cell, as measured by UE, is generally inversely proportional to the distance of that UE from the eNodeB. That is, a UE close to the eNodeB will have a relatively high RSRP value, and a UE further from the eNodeB will have a relatively RSRP value. As will be known to those skilled in the art, the RSRP value is not solely proportional to distance, but will also be affected by other factors, such as obstructions to the radio signal path between the UE and the eNodeB.

CQI, Channel Quality Indicator, is used by the mobile device to indicate the channel quality to the eNodeB. The CQI reported value is between 0 and 15.

Conventionally, the mobile terminal or network determines whether a handover/cell reselection procedure should be triggered in dependence upon measurements of the radio signals (e.g. Reference Signal Receive Power, RSRP) of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one cell to another cell are performed by the network, whereas calculations whether to perform cell reselection are performed by the mobile terminal.

HII (High Interference Indicator) is an indicator sent on the X2 interface between eNodeBs to indicate which resource blocks will be used for cell-edge UEs. See 3GPP TS36.423 Section 9.2.18. Cell-edge UEs cause more interference as they transmit at higher power. The use of resource blocks by cell-edge UEs is co-ordinated between cells to reduce interference.

According to the LTE Specifications, an eNodeB may be provided with a multiple-input multiple-output (MIMO) system with up to four transmit antennae per cell. Similarly, the LTE mobile terminals may be provided with up to four receive antennae.

An operator is typically allocated a frequency band of, for example, 20 MHz, divided into groups of 180 KHz. In each of these groups there are 1200 sub-carriers. Each eNodeB can measure the uplink receive power on each of the sub-carriers. This is not necessarily done in LTE. However, the principle is known from GSM.

Data are transmitted in the downlink—DL—(i.e. in the direction from eNodeB to mobile terminal) by orthogonal frequency division multiple access (OFDMA). According to OFDMA the available frequency spectrum is divided into several sub-carriers. To maximise spectral efficiency, the frequency responses of the sub-carriers are overlapping the orthogonal. The OFDMA downlink transmissions and the uplink—UL—transmissions (i.e. transmissions from a mobile terminal to an eNodeB) are organised into frames of 10 ms duration. This frame structure is applicable to frequency division duplex (FDD)—the use of frequency-division multiplexing to separate outward and return signals—and time division duplex (TDD)—the use of time-division multiplexing to separate outward and return signals.

Figure 2:
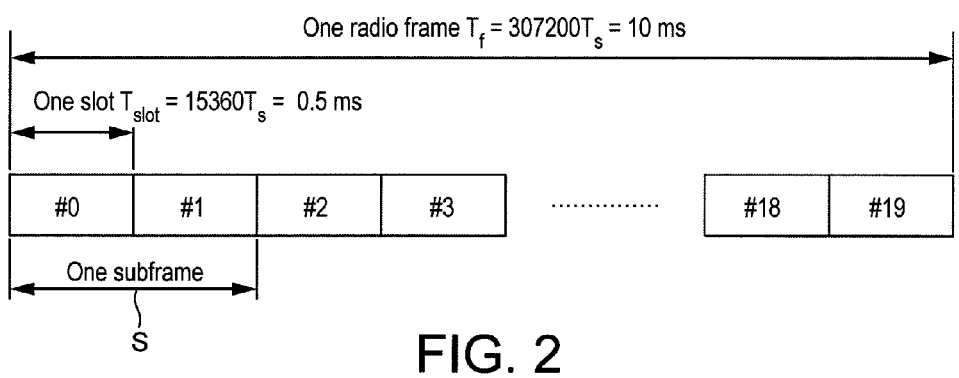
FIG. 2 shows the structure of an LTE FDD frame structure (Type 1)

As shown in FIG. 2, each frame consists of 20 slots (#0, #1, . . . , #19) of 0.5 ms. A sub-frame S is defined as two consecutive slots and therefore has a duration of 1 ms. For FDD, for a particular frame, 10 sub-frames are available for downlink transmissions and 10 sub-frames are available for uplink transmissions. The uplink and downlink transmissions are separated in the frequency domain. For TDD, a sub-frame is either allocated to downlink or uplink transmissions. However, the first and sixth sub-frame are always allocated for downlink transmissions.

Figure 3:
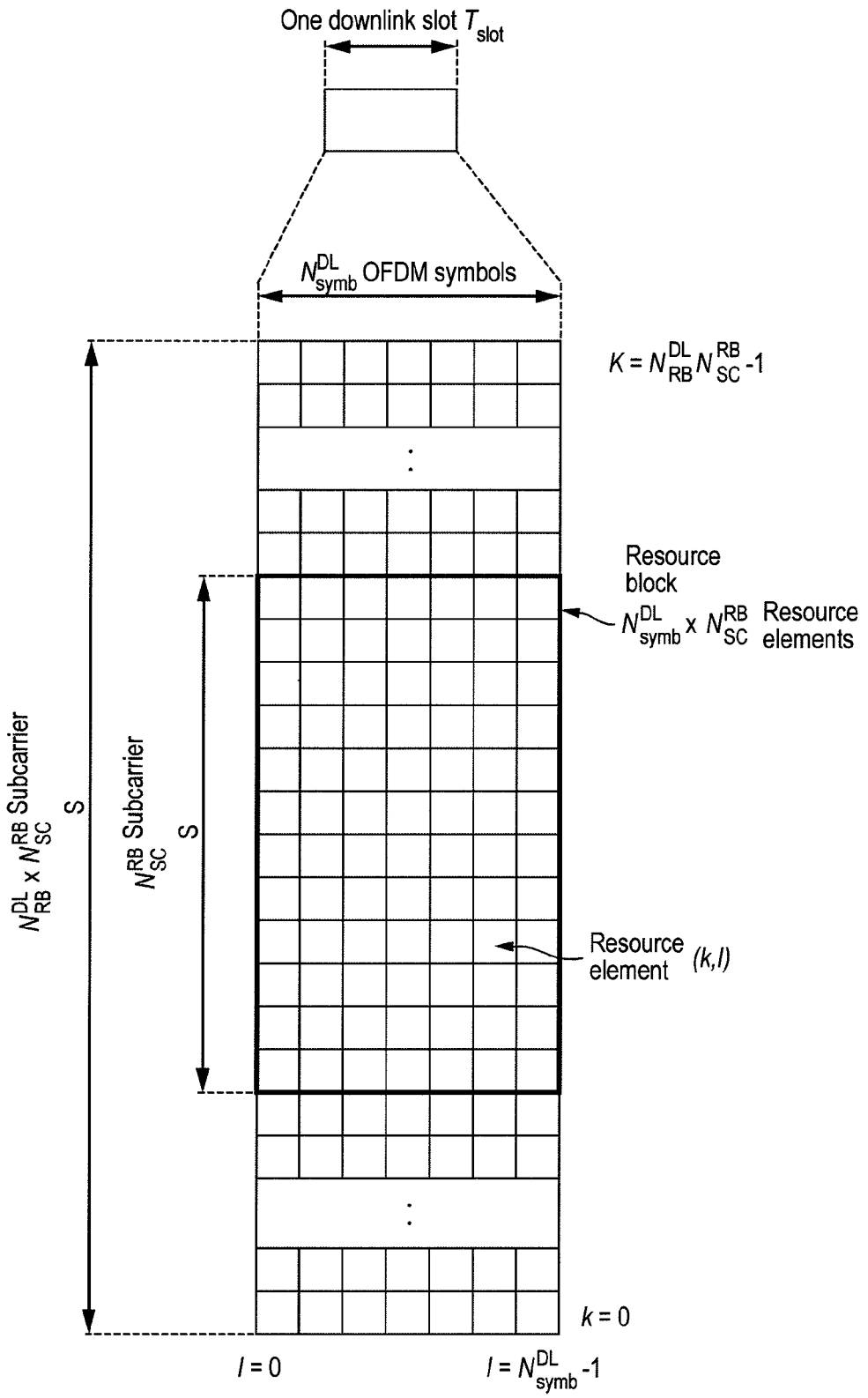
FIG. 3 shows in detail the structure of a downlink slot in the LTE for normal cyclic prefix.

As shown in FIG. 3, the FDD downlink signal of each slot can be defined by a resource grid of a predetermined number of sub-carriers (according to the bandwidth available) and a predetermined number of OFDMA symbols. For MIMO transmission there is one resource grid per antenna port. There are twelve consecutive sub-carriers in the frequency domain in FIG. 3.

Data is allocated to UEs in resource blocks (RBs) which in FIG. 3 consist of 12 consecutive sub-carriers in the frequency domain and 7 consecutive OFDM symbols. A resource block consists of 12×7 resource elements (REs). Sub-carriers are grouped into subchannels (subchannels can be thought of an individual users). Sub-carriers in each subchannel are spread over the full channel spectrum to minimize multipath fading effects. These subchannels can be allocated "on-the-fly" as necessary to optimize the use of available bandwidth.

Each eNodeB transmits a reference signal (RS) in the downlink for each antenna port that is unique within the particular cell, and therefore allows the cell to be identified and which are used by the mobile terminals for channel estimation and physical measurements (such as signal strength and signal to noise ratio, average path loss and signal-to-interference ratio) collectively referred to as channel quality. The channel quality information is used, for example, to make handover and cell reselection decisions. In LTE the downlink reference signal is modulated into reference signals embedded within the resource blocks.

The measurements represented in the resource blocks are transmitted in the uplink back to the eNodeBs from the mobile terminals.

Figure 4:
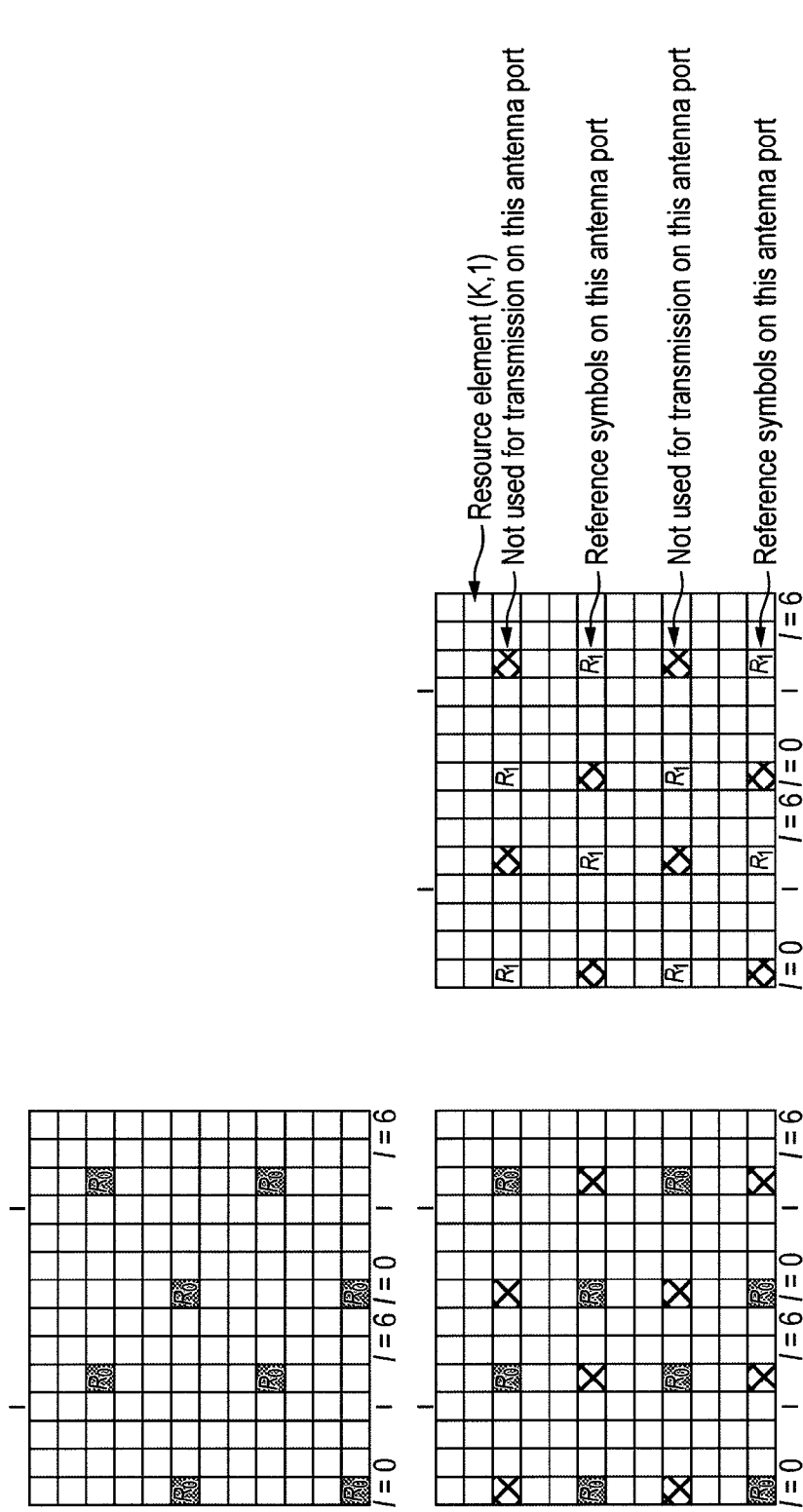
FIG. 4 shows the resource element mapping of reference signals in LTE for a MIMO antenna.
Figure 4:
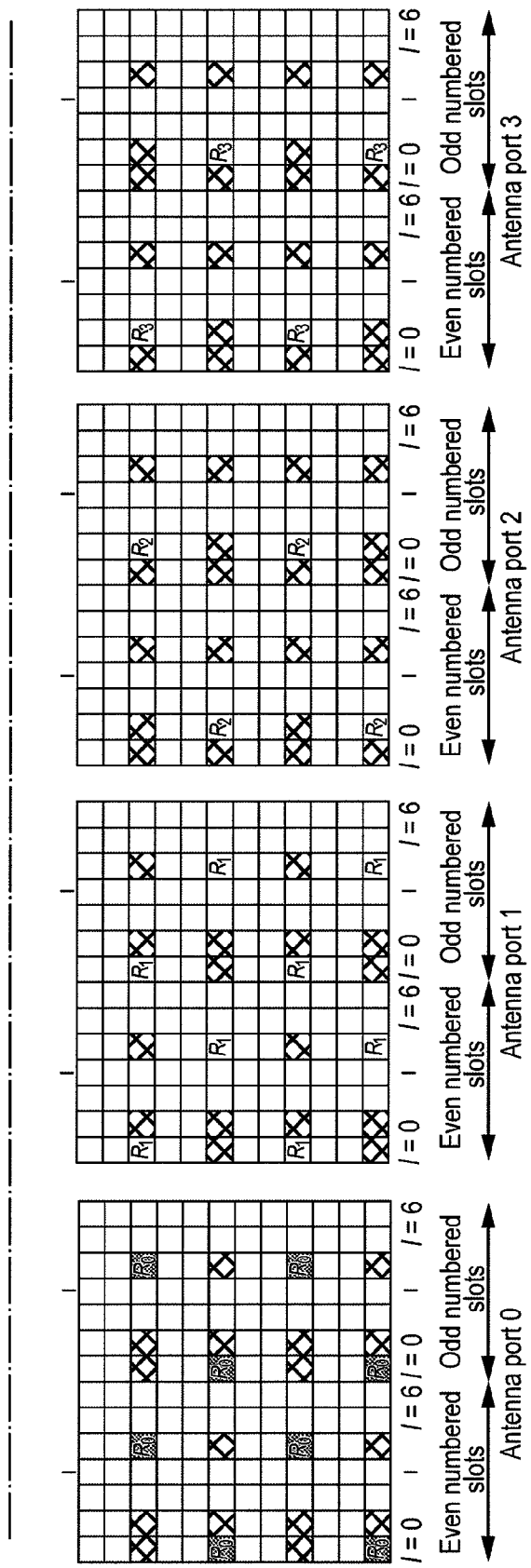

FIG. 4 shows how reference signals are embedded within the two slots of a subframe. In FIG. 4 the reference signals of the first antenna port are designated $R_0$, the reference signals of the second antenna port are designated $R_1$, the reference signals of the third antenna port are designated $R_2$, and the reference signals of the fourth antenna port are designated $R_3$. $R_0$, $R_1$, $R_2$ and $R_3$ are transmitted in each normal sub-frame of the radio frame, depending on the number of cell specific antenna ports over the entire frequency band. It will be appreciated that the inclusion of reference signals within the resource block reduces the amount of data that can be transmitted. This overhead increases with number of antennas. On the other hand, reducing the number of reference signals reduces the channel estimation accuracy. The reference signals for $R_2$ and $R_3$ are not transmitted as frequently as reference signals for $R_0$ and $R_1$ in a subframe to reduce the overhead, and it is therefore more difficult to track fast channel variations. However, four antennae are used for low mobility terminals only, anyway.

The reference signals are transmitted on equally spaced subcarriers within the first, second and fifth (third from-last) OFDM symbol of each slot in a cell with 4 antenna ports. The UE must get an accurate Carrier to Interference Ratio (CIR) from each transmitting antenna. Therefore, when a reference signals is transmitted from one antenna port, the other antenna ports in the cell are idle. It should be noted that every symbol containing a reference signal also contains control/user data in other resource elements not occupied by the reference signal.

For Rel-8 LTE, the eNodeB sends reference signals in every 1 ms sub-frame. An LTE capable UE performs during each sub-frame normal channel estimation, CQI, measurements and mobility measurements based on this cell specific reference signals $RS_{eNB}$ sent by the eNodeB in the DL frequency band. For LTE, CQI measurement may be on a sub-band basis (only a few sub-frames are used) or entire bandwidth is used. For smaller bandwidths (6-7 resource blocks, RBs) which corresponds to bandwidth's less than 3 MHz, only wideband CQI is reported by the UE. Transmissions from the UL to the eNodeB are sent in the UL frequency band.

LTE is based on a rather flat architecture compared to 2G and 3G systems. Each cell is served by an eNodeB ("base station"), and handovers between cells are handled mainly by signaling directly between the eNodeBs, and not via any radio network controller node as in 2G and 3G. The cell broadcasts an identifying signature, a "fingerprint" (Physical Cell Identity, PCI), which the mobiles use to identify cells, and as time and frequency reference. These identifying signatures are not unique (there are 504 different PCIs in LTE).

In LTE a mobile is required to measure the reference signal received power (RSRP) (i.e. the received power of the signature sequence symbols associated with a particular PCI) of candidate cells and report to the serving cell (the cell serving the mobile at the moment). It is important to detect and resolve local PCI conflicts, i.e. when two cells in the vicinity of each other uses the same PCI, to avoid ambiguities in the measurement reports.

Generally, resource blocks are allocated by each eNodeB, and between neighbouring eNodeBs, in such a way as to minimise interference in a controlled manner. However, despite such allocation, interference still occurs to some degree. This interference at a location can be considered to have three components:

(1) "Predicable interference" from other transmissions of the eNodeB and neighbouring eNodeBs on the same LTE network. Such predicable interference occurs despite the resource block allocation steps taken (mentioned above), but is at an acceptably low level.

(2) "Non-predicable interference": In a communication system such as LTE various potential non-predicable interference sources exist, including:

Same LTE network, with unexpected inter-cell interference, e.g. a cell 50 miles away on a hill, or a femto cell Other LTE network, e.g. co channel at international boundary, or incorrect operation of a network with spectrum adjacent to our own Faulty radio equipment, e.g. LTE UE, non-LTE mobiles, non-LTE base stations, domestic TV senders.

Illegal transmitters including cellular blockers

Faulty equipment e.g. shop security tag system, industrial RF induction heaters, low energy light bulbs, roadside traffic monitors Complex intermodulation products at a shared base station site.

All of these noise sources cause interference on a particular portion of the frequency spectrum.

(3) "Background noise": In addition, background Johnson-Nyquist noise (also known as thermal noise, Johnson noise or Nyquist noise) will be present. Such noise is the electronic noise generated by the thermal agitation of the charge carriers (usually the electrons) inside an electrical conductor at equilibrium, which happens regardless of any applied voltage. Thermal noise is approximately white, meaning that the power spectral density is nearly equal throughout the frequency spectrum.

The embodiments of the present invention seek to identify non-predicable interference. It may then be possible to remove at least some of these non-predicable interference sources and improve the network performance.

UL Interference Detection

A first embodiment of the inventions is concerned with uplink interference detection.

As mentioned above, a network operator operating an LTE network will be allocated a particular frequency band. Other frequency bands may be allocated to other LTE networks operated by other LTE network operators.

Each eNodeB of an operator's network can measure UL receive (rx) power for each UL RE (resource element) in the operator's band. According to this embodiment, the network (preferably the eNodeB) stores the maximum rx power received for each subcarrier, after excluding UL subcarriers allocated to its own users and subcarriers subject to HII (high interference indications) information from neighbour cells. That is, each cell detects the maximum rx power received for each subcarrier in the operator's band; each cell excludes the maximum rx power values that are either (1) from subcarriers allocated to UEs served by the cell or (2) from subcarriers subject to HII (high interference indications) neighbour cells; each cell then records the remaining maximum rx power values.

It should be expected that in the long term, e.g. a week, all subcarriers on a cell will have very similar maximum levels. When they are not similar, it is an indication that there is unexpected (non-predicable) interference.

Overview of the Three Main Stages of the Embodiment

1) Maintain a record of the strongest received power level for each subcarrier at each cell, indefinitely.
2) Periodically, e.g. once per hour, analyse the records of all subcarriers on a cell and test to see if there may be "Non-predicable interference". If the tests are positive, trigger further action.
3) When further action is triggered:
   a. Trigger O&M alarms
   b. Trigger action on surrounding cells
   c. If supported, trigger active detection.
   d. Otherwise, perform more detailed passive logging for a fixed period, of max levels and min levels.
   e. Certain tests are performed.

Apart from the tests in 3e above, analysis of the various logs is expected to be manual.

Detail of the Three Stages

Stage 1: Maintain a Record of the Strongest Received Level for Each Subcarrier, Indefinitely.

In LTE, conventionally, the eNodeB measures UL rx power of idle subcarriers and uses this information for assignment of resource blocks. A new UL rx power value for each subcarrier is typically available every symbol period (approx 71 microseconds) or available every slot (0.5 ms) or available every subframe (1 ms). The embodiment uses this information for "Non-predicable interference" detection.

For each subcarrier, as each new UL rx power measurement is received, it is stored. Also, for each subcarrier, as each new UL rx power measurement is received, the new measurement is compared with the stored value. If the new measurement is greater than the stored value then the stored maximum value is updated with the new one, as a high UL rx power measurement is associated with interference. The exception is when an expected UL rx power source exists for an UL subcarrier, e.g. where the eNodeB has allocated the subcarrier to one of its own UEs, or where a High Interference Indication (HII) has been received from a neighbour eNodeB for that subcarrier. In this case, the stored value for that subcarrier is not updated. Thus "Predicable interference" sources are excluded.

This measurement storing process generates a table of maximum UL rx power for each subcarrier for each cell, for example:

TABLE 1 maximum UL rx power for each subcarrier recorded by Cell_N Cell_N

| Subcarrier | Max UL rx power |
|---|---|
| 1 | 50 |
| 2 | 65 |
| ... | |
| y | 42 |

Figure 5:
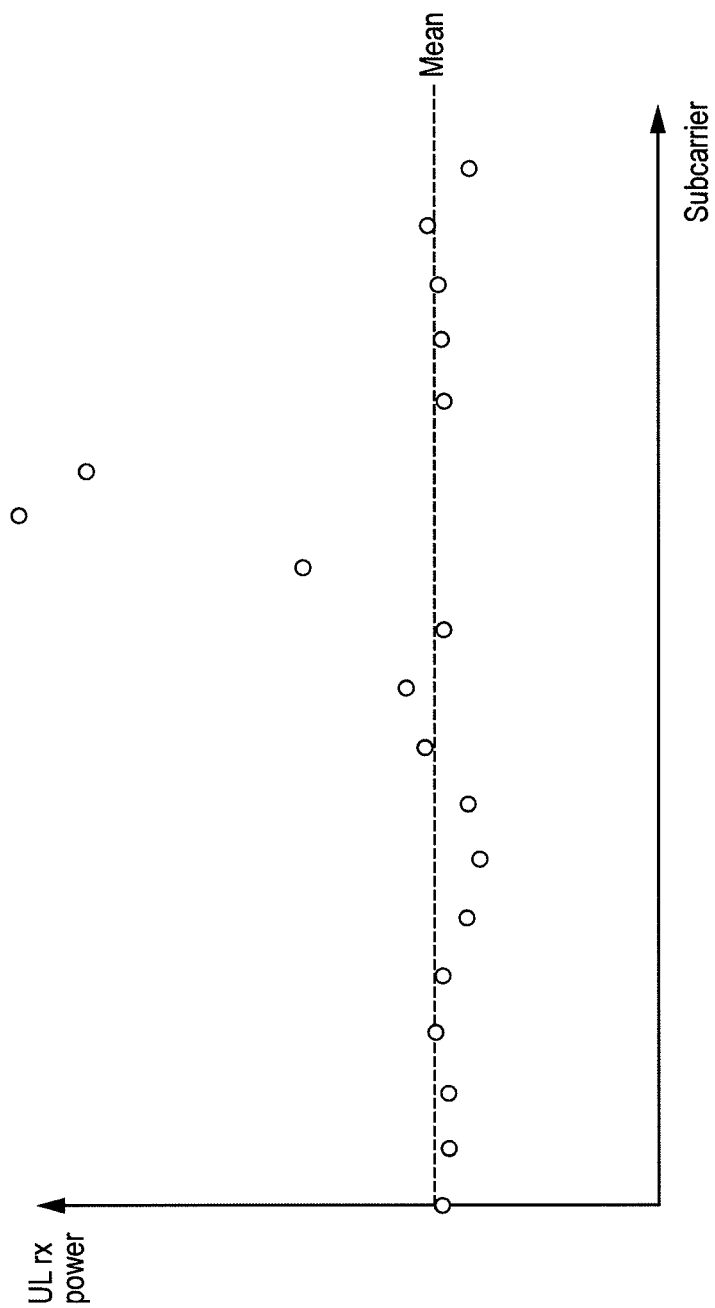
FIG. 5 shows an a graph of example maximum received UL rx power measurements, per subcarrier, in a cell.

FIG. 5 shows an example representation of maximum received UL tx power measurements, per subcarrier, in a cell.

Normally the measurement storing process will run indefinitely. However, it is possible to reset the table of stored maximum values by command, for example after an interference problem has been resolved or automatically reset the table, for example after a new neighbour cell relation is created. Periodically, e.g. every hour, analysis is performed on this table.

It is possible to maintain a record of minimum received values, as well as or instead of maximum values. The distinction between maximum and minimum is that the minimum values are useful for detecting low level interference, but not for intermittent interference. Intermittent interference cannot be detected from long-term minimum levels because, whenever the interference stops, the level of interference measured will be over-written by the (lower) interference-free measurement. Therefore, intermittent interference can only be detected if the table of minimum values per subcarrier is periodically frozen and a new table started, for example creating a new table every 30 minutes. It is therefore necessary to store a set of tables, with each table showing minimum values for each (e.g. 30 minute) period.

Another option is to simply periodically record the measured value of the UL rx power for each subcarrier. The power measurements can then be processed in the analysis stage.

The steps performed to maintain the table of maximum UL rx power measurement at each Cell_N will now be described in more detail with reference to the flow chart of FIG. 6.

At each symbol interval, or other time interval, (step 6A) the eNodeB receives the UL rx power measurement for each sub-carrier (step 6B). A separate power measurement is received for each sub-carrier, and each of these measurements will be processed in the same way. For the sake of simplicity, the processing of the power measurement for just one of those sub-carriers will be described below, but each of the other sub-carrier power measurements will be handled in the same way.

At step 6C it is determined whether a sub-carrier is allocated to a UE served by the cell.

If at step 6C it is determined that the sub-carrier is not allocated to a UE on the cell then, at step 6D, it is determined whether the eNodeB has received a HII from a neighbour eNodeB regarding the sub-carrier.

If at step 6D it is determined that there is no HII for the sub-carrier then, at step 6E, it is determined whether the newly received power measurement is greater than the stored measurement for that sub-carrier.

If at step 6E it is determined that the newly received power measurement is greater than the stored power measurement then, at step 6F, the stored value for the sub-carrier is replaced with the newly received power measurement (which is higher than the previously stored power measurement).

On the other hand, if any of the decision criteria of steps 6C, 6D or 6E are met then, at steps 6G, 6H and 6I respectively, the maximum stored power measurement value for the sub-carrier is not updated.

Steps 6D, 6H; 6E, 6H exclude "Predicable interference" from the recorded maximum power values.

After step 6F, 6G, 6H or 6I is performed, step 6J follows at which it is determined whether a particular time interval has passed—for example, one hour. This determination may be made by resetting a "timer H" to zero when the process performed by the flow chart of FIG. 6 is initially commenced and then incrementing the timer H with time. Each time step 6J is performed, the value of timer H is checked to see whether it has reached one hour.

If, at step 6J, it is determined that the timer has not reached one hour, the procedure returns to step 6A, and the new power measurements are received at the next symbol interval and are processed in the manner discussed above.

On the other hand, if at step 6J it is determined that the timer H has reached one hour then, at step 6I, the timer H is reset to zero, and then begins counting again.

At step 6J the analysis cycle is triggered, which analysis cycle will be described in more detail below.

Figure 6:
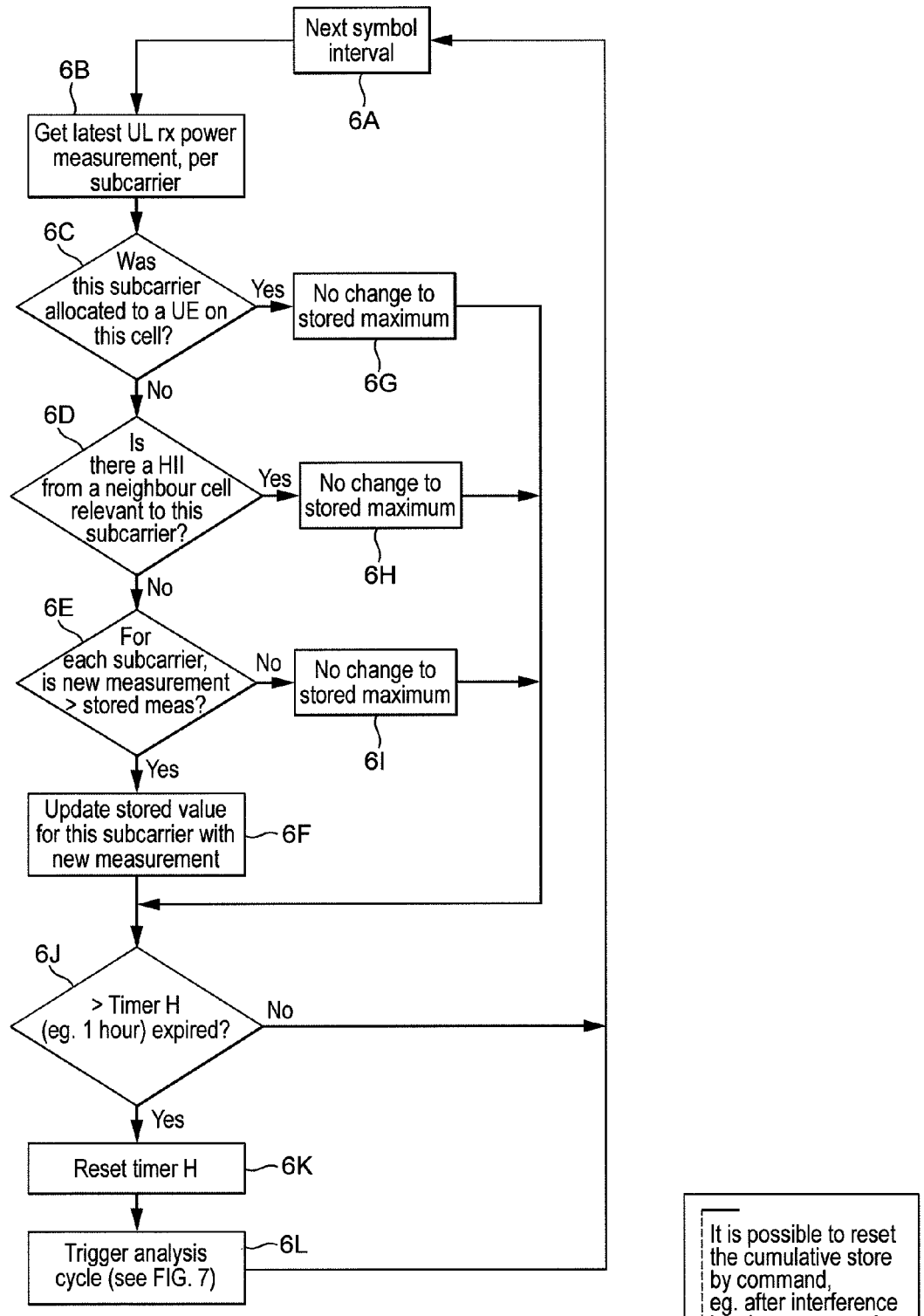
FIG. 6 is a flow chart showing the procedure for storing the maximum UL rx power measurement for a subcarrier.

It will be apparent to those skilled in the art that the flow chart of FIG. 6 can be modified to instead record the minimum received UL tx power measurements, if desired.

Stage 2: Periodically, e.g. Once Per Hour, Analyse this Record of Cumulative Maximum Received UL tx Power Measurements and Test to See if there May be Unexpected Interference. If the Tests are Positive, Trigger Further Action.

Periodically, each eNodeB performs a statistical analysis of the table for each of its cells, i.e. the table of the maximum value of each subcarrier. For example, the eNodeB may calculate the highest (maximum of maximums) value in the table, mean of all values in the table, and various percentiles of the values in the table.

Tests are then performed to detect if any subcarriers in the cell have a different pattern from other subcarriers in the same cell.

For example, for cell "Cell_N" the following tests may by performed for each of its subcarriers:

The maximum UL $rx$ power−mean of maximum UL $rx$ powers of all subcarriers measured on Cell_$N$>threshold $A$ (1)

The $95^{th}$ percentile of UL $rx$ power−$50^{th}$ percentile rx power of all subcarriers on Cell_$N$>threshold $B$ (2)

Should these tests be positive for any particular subcarrier(s), "Non-predicable interference" is suspected on those subcarrier(s), and certain actions can be triggered. The subcarriers for which the tests are positive may be ranked, so the subcarrier with the highest rank is the one that exceeds the threshold by the greatest amount.

Whether or not the tests are positive, values of the table, e.g. mean and maximum, are reported to O&M periodically. This allows all cells in the network to be rated, and the worst cells identified, allowing action to be taken.

A snapshot of the whole table is stored periodically, allowing any future investigation to examine a history of the interference.

There are many possibilities for the calculations, tests, rating and ranking values.

The maximum values table will be less reliable when it has been accumulating data for only a short period. Therefore, initialisation thresholds, which are more conservative than normal thresholds, can be used in the tests during an initial period, to prevent false alarms. That is, during an initial period, the thresholds A and B may have a higher value than subsequently.

Figure 7:
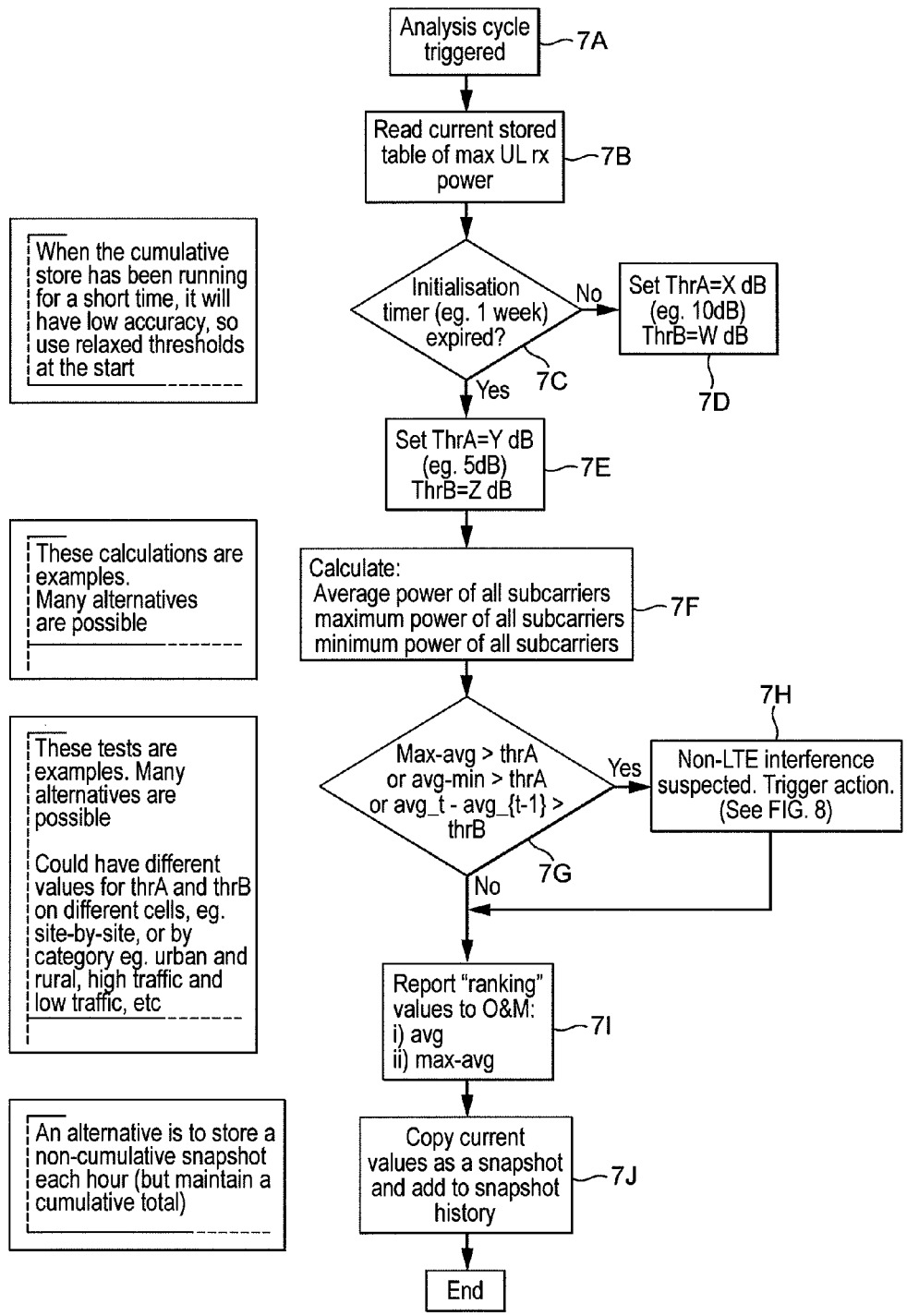
FIG. 7 is a flow chart showing the procedure for analysing the maximum UL rx power measurements for a subcarrier.

The analysis procedure will now be described in more detail with reference to the flow chart of FIG. 7.

At step 7A the analysis cycle is triggered. Typically, the analysis cycle will be triggered after a predetermined time interval has passed. For example, the analysis cycle may be triggered once per hour.

At step 7B the content of the current stored table of maximum UL rx power for the cell (such as Table 1 Cell_N above) is read.

As mentioned above, the values from the table are analysised and compared to certain thresholds to determine whether interference is present. When measurement values have been collected for only a limited period, they are less likely to provide an accurate representation of the actual interference situation. Therefore, the threshold used to determine when interference is present may be relaxed during an initial period when measurement values are being accumulated. This is an optional feature, and is shown in steps 7C, 7D and 7E of the flow chart.

When the measurement values initially start to be collected, an initialisation timer is reset to zero and is then incremented with time. At step 7C it is determined whether this initialisation timer has expired. That is, it is determined whether measurement values have been collected for a predetermined period of time, such as one week.

If at step 7C it is determined the initialisation timer has not expired then, at step 7D, a more "relaxed" threshold values are applied. If, on the other hand, at step 7C it is determined that the initialisation timer has expired (i.e. power measurements have been taken for more than one week) then, at step 7E, the thresholds are set to their normal values. According to this procedure, during the first week that power measurements are taken, the value of threshold A used in calculation (1) above may be set to 10 dB whereas after one week the value of threshold A used in equation (1) above may be set to 5 dB. Thus, during the first week that power measurements are taken, an indication that interference is occurring will only be given if there is a significant difference between the highest maximum power recorded for any sub-carrier and the mean of the maximum powers of all the sub-carriers during the initialisation period, or after the difference needs to be less to trigger an indication that interference is present.

At step 7F various calculations are performed on recorded power measurements for each of the sub-carriers of a cell. For example, the mean power of all sub-carriers may be calculated, the maximum power of all sub-carriers may be calculated and/or the minimum power of all sub-carriers may be calculated. These calculations may be the mean/maximum/ minimum as accumulated since measurements were recorded in the table (i.e. since the last table reset). It should be appreciated that these calculations are examples and that many alternative calculations are possible.

At step 7G calculations are performed to determine whether "Non-predicable interference" has occurred. For example, the eNodeB may calculate the difference between the maximum power of each sub-carrier and the mean of the maximum power of all the sub-carriers, and determine whether this exceeds threshold A—this corresponds to equation (1) above.

Alternatively, or additionally, the eNodeB may calculate the difference between the mean of the powers of all sub-carriers and the minimum power of each sub-carrier and to determine whether this is exceeds threshold A.

Alternatively, or additionally, the eNodeB may calculate the difference between the average of the power of all the sub-carriers measured over one period and the average of the powers of all the sub-carriers measured over another period of the same duration but occurring earlier in time, and determine whether this exceeds another threshold.

It should be appreciated that the calculations in step 7G are merely examples, and that any alternatives are possible. In some situations it may be advantageous to have different values for thresholds (e.g. A and B) for different cells. The threshold values for each cell may be set separately, or the cells may be categorised into groups such as urban or rural, high traffic and low traffic, etc, and each group allocated a different threshold.

If at step 7G any of the thresholds are exceeded then, at step 7H, "Non-predicable interference" is suspected and appropriate action is triggered in the manner to be discussed below with reference to the flow chart of FIG. 8.

On the other hand, if at step 7G it is determined that none of the thresholds are exceeded then, at step 7I, rating values are reported to the network O&M periodically. Such rating values may be the mean and maximum power recorded for its sub-carriers for a cell. As discussed above, this allows the cells in the network to be rated.

At step 7J the content of the whole table is copied into a file so that a history of the values in the table can be compiled, as discussed above. Alternatively, a snap shot of the values in the table may be stored each hour whilst the totals in the main table continue to be updated.

Stage 3: Further Action Triggered.

The actions discussed below will usually be triggered (in step 7H) in response to the analysis discussed above. These actions may also be triggered by O&M command. All of these actions can be triggered by eNodeBs near to the eNodeB which collected the data in the table also. This enables an interference source to be localised during manual analysis.

Figure 8:
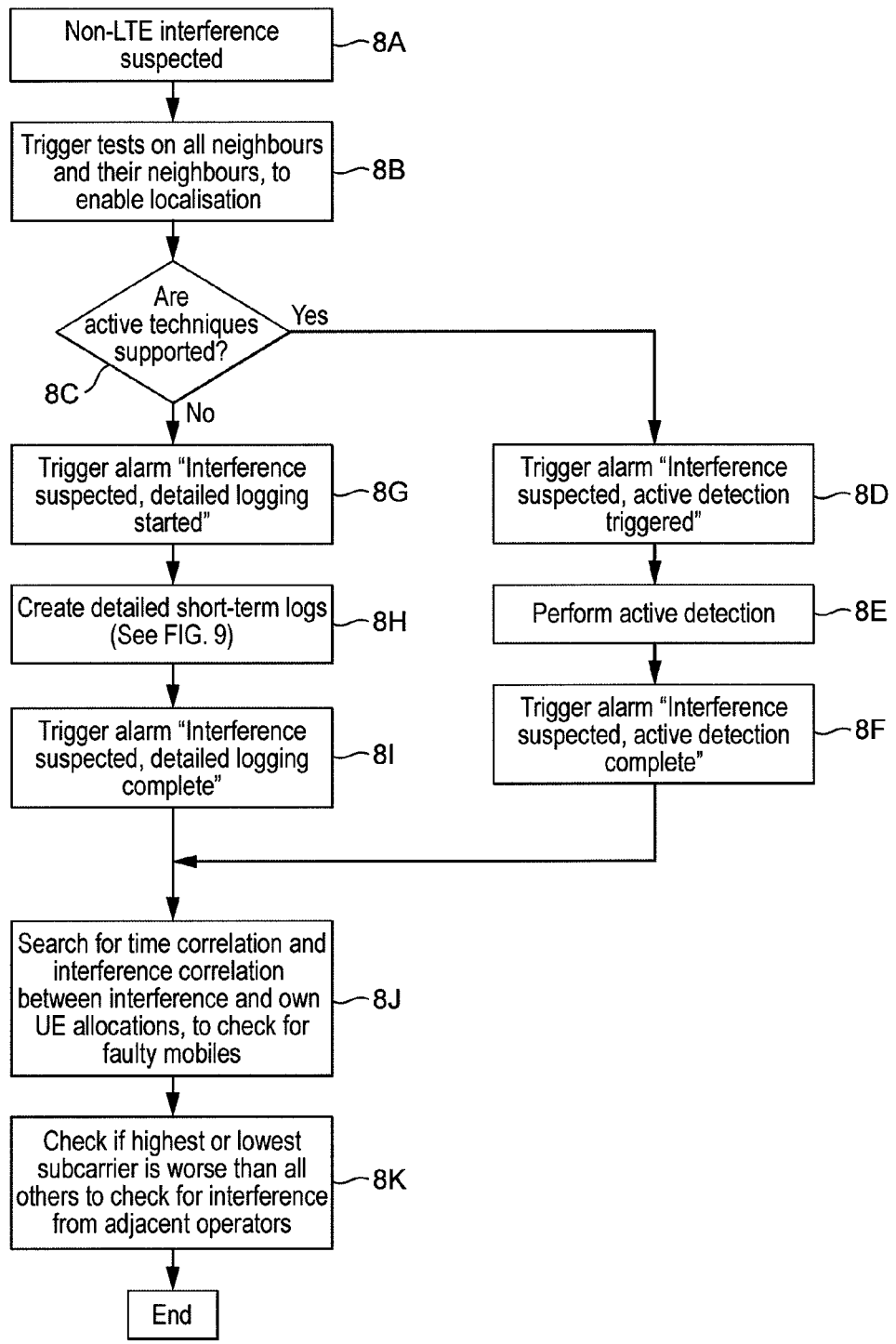
FIG. 8 is a flow chart showing the steps performed to determine the action to be triggered when interference is suspected.

The flowchart of FIG. 8 shows the steps performed to determine the action to be triggered.

At step 8A it is established that "Non-predicable interference" is suspected. This corresponds to step 7H of FIG. 7 described above.

At step 8B it is determined that tests should be performed on the cell and its neighbouring cells to try to identify the source of the interference.

At step 8C it is determined whether active interference techniques are supported. That is, it is detected whether communication between eNodeBs is possible in such a manner that the eNodeB can instruct its neighbouring eNodeBs to temporarily cease to use particular sub-carriers.

If at step 8C it is determined that active techniques are supported then, at step 8D, an alarm in the eNodeB is triggered to indicate that "Non-predicable interference" is suspected and that at active detection should be performed.

At step 8E active interference detection is performed. Active interference detection is useful when other detection techniques are inconclusive or more detailed information is desired, and may use the following steps, for example:

Pattern of suspected interference is identified, e.g. continuous, or 1700 to 1730 every Friday.

Originating eNodeB decides at what time and on which subcarrier(s) to request a quiet period—that is, to request that the subcarrier(s) should not be used for a period. The subcarriers are ranked (as discussed above) if there is more than one subcarrier to remain quiet.

Originating eNodeB sends message to all neighbour eNodeBs with details of the quiet period, namely:
Reference number
Subcarrier(s) to remain quiet, together with an rank if there is more than one subcarrier
Start time
Duration of quiet period per subcarrier (e.g. 500 ms)

Neighbour eNodeBs respond with will comply/will not comply/might comply message

Originating eNodeBs can cancel, using the reference number, and reapply according to these responses.

At the arranged time, all the eNodeBs do not allocate the highest ranked subcarrier to any UEs for the defined duration, after which the next ranked subcarrier is not allocated, then the next and so until all the ranked subcarriers have been tested. A special case exists to test all subcarriers, from the highest to the lowest.

The originating eNodeB monitors the correct (quiet) UL subcarriers at the relevant time.

The "might comply" eNodeBs report compliance or otherwise.

The subcarriers that are not used (the ranked subcarriers, those with a quiet period) are those that are identified as being subject to interference. If the interference continues when these subcarriers are not used, then the originating eNodeB will have confidence that any UL received power was from an unexpected source, and not "Predicable interference" related to normal operation of the network. The location of the unexpected source may be determined by triangulation using data from a plurality of cells. Action to stop the unexpected source may be taken.

This technique is "active" in the sense that it alters the behaviour of eNodeBs (to stop them using certain subcarriers). This technique requires inter-eNodeB signalling.

At step 8F an alarm in the eNodeB is triggered that indicates that interference is suspected and that active detection has been completed.

On the other hand, if at step 8C it is determined that active interference techniques are not supported, then at step 8G an alarm in the eNodeB is triggered that indicates interference is suspected and that detailed logging of power measurements should be performed.

At step 8H the passive logging procedure for creating detailed short-term records of received power are performed.

In step 8H detailed fast passive logging is performed for a fixed period. This rate of logging is not appropriate for all eNodeBs in the long term, but it is useful to have more detailed information for suspect cells. It may be useful to vary the period of this fast logging to catch intermittent interference sources, e.g. initially 5 minute samples for 1 week, later 15 second samples for 5 minutes. A store of maximum UL rx power values can be made as well as a store of minimum UL rx power values. The distinction between maximum and minimum is that the minimum values are useful for detecting low level interference, but not for intermittent interference.

Figure 9:
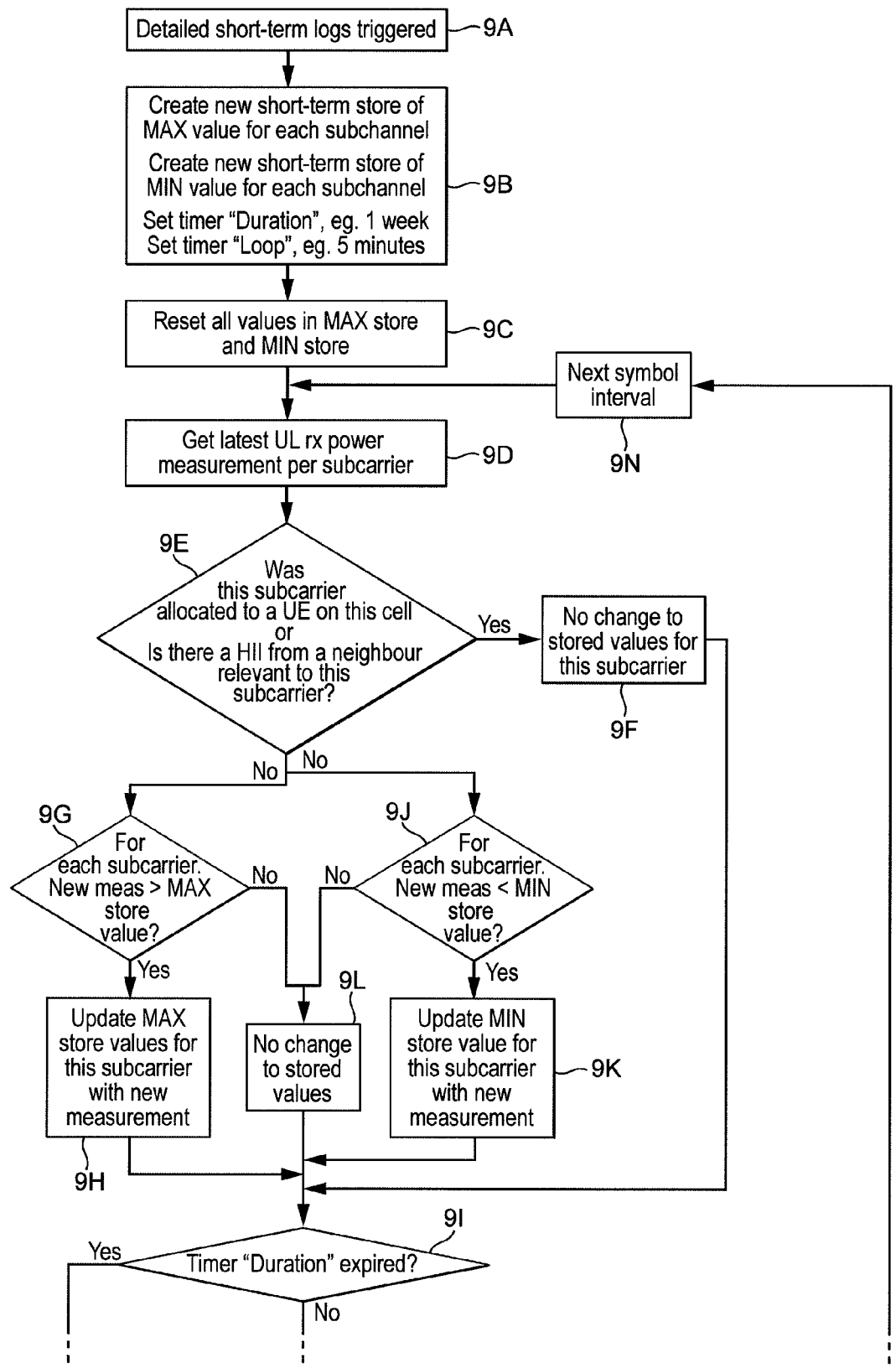
FIG. 9 is a flow chart showing the steps performed to compile a detailed short-term log of rx power measurements.
Figure 9:
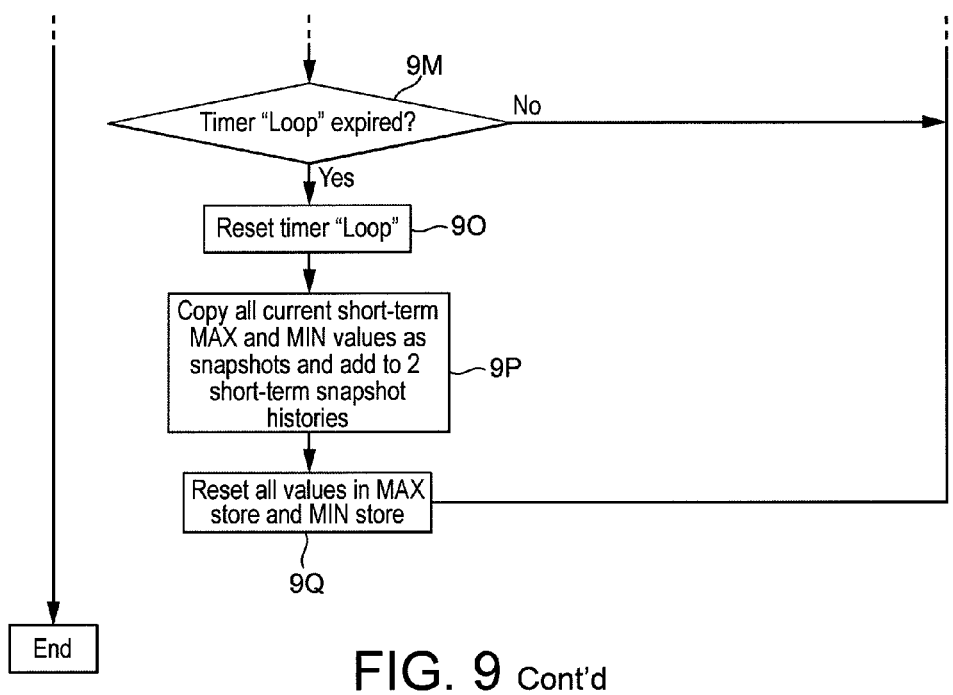

The flowchart of FIG. 9 shows in more detail the steps performed in the detailed fast passive logging step 8H.

At step 9A the trigger to collect detailed short-term logs of received power for the cell is received. This step 9A corresponds to step 8H.

At step 9B a new short-term store of maximum received power signals for each subchannel of the cell is created, and a corresponding new short-term store of the minimum received power values or each sub-carrier of the cell is created.

A first timer "duration" is set to have a period of one week, and that timer is incremented with time. A second timer "loop" is set with a duration of five minutes, and that timer is incremented with time. The periods of one week and five minutes are examples only, and other periods could be used.

At step 9C the values in the maximum stores established in step 9B are reset to zero, and the minimum stores established in step 9B are reset to a very high value or infinity.

At step 9D the eNodeB receives the received power measurement for each sub-carrier of each cell. A separate power measurement is received for each sub-carrier, and each of these measurements will be processed in the same way. For the sake of simplicity, the processing of the power measurement for just one of these sub-carriers will be described below, but each of the other sub-carrier power measurements will be handled in the same way.

At step 9E it is determined:
(A) whether the sub-carrier is allocated to a UE served by the cell, or
(B) whether there is HII from a neighbouring eNodeB that is relevant to the sub-carrier.

If either (A) or (B) are true, then, at step 9F, no change is made to the value stored for the sub-carrier in the maximum and minimum value stores. Step 9I (to be described below) is then performed.

If, at step 9E, it is determined that neither condition (A) nor (B) is true, then step 9G (and also step 9J, to be described below) is performed. At step 9G it is determined whether the received power measurement for the sub-carrier obtained in step 9D exceeds the stored maximum power measurement in the short-term store. Of course, at the first iteration of the process, the maximum stored value will be zero, and the received power measurement will exceed this.

At step 9H the relevant location in the short-term store for the maximum value of the sub-carrier is updated. Step 9I is then performed (to be described below).

At step 9J the received power measurement for the sub-carrier obtained in step 9D is compared to the minimum value for that subchannel stored in the short-term store. If the new value is less than the minimum stored value, then, at step 9K the minimum value stored in the short-term minimum store for the sub-carrier is updated with the new received value. During the first iteration of the process, the minimum value short-term store will be established with a high value or infinity set for each of the subchannels, and so the first received power measurement will always be less than the minimum stored value.

If at step 9G it is determined that the received power value is less than or equal to the maximum stored value, or, if at step 9J it is determined that the new received power value is greater than or equal to the minimum stored value, then at step 9L no changes are made to the stored values in the short-term store of maximum values and of minimum values. Step 9I is then performed.

At step 9I it is determined whether the timer "duration" has expired. That is, it is determined whether one week has passed since the timer was set at step 9B. If it is determined that the timer "duration" has expired, then the procedure ends.

On the other hand, if it is determined at step 9I that the timer "duration" has not expired then, at step 9M, it is determined whether the timer "loop" has expired (that is, it is determined that less than five minutes has elapsed since the timer "loop" was established in 9B). If the timer "loop" has not expired then, at step 9N the next symbol interval is detected, after which the procedure returns to step 9D and continues in the manner discussed above.

On the other hand, if at step 9M it is determined that the timer "loop" has expired, then at step 9O the timer "loop" is reset to zero and is incremented with time.

At step 9P the short-term maximum received power and minimum received power values recorded in the short-term stores at step 9H and 9K are copied to respective short-term snapshot history stores. The maximum and minimum received power values for each sub-carrier will be copied to the history for that sub-carrier.

At step 9Q all the values stored in the maximum received power short-term and the minimum received power short-term store are reset. In the maximum store, the values are set to zero, and in the minimum value store, the values are set to a very high number or infinity.

Step 9N it then performed and the next symbol interval is awaited, after which the procedure returns to step 9D and continues in the manner discussed above.

When the procedure of flowchart 9 ends, then step 8I in FIG. 8 is performed (although this step and subsequent steps of FIG. 8 may be performed whilst the short-term data are being compiled, although the results will not be so accurate).

After the "detailed logging complete trigger" has been received at step 8I, or after "active detection trigger" has been received at step 8F, the automated steps 8J and 8K are performed.

At step 8J a search is performed for a correlation between transmissions from the cell's own UEs and interference in the time and frequency domains. E.g., a UE may have poor filtering and transmit on subcarriers adjacent to those allocated to it, or it may fail to stop transmitting at the end of its allocated time.

At step 8K a search is performed for interference at the top and bottom of the frequency band allocated to the network operator. This would detect a situation where a poor filtering by the user of the adjacent frequency allocation, e.g. a competitor cellular operator, leads to interference.

Steps may then be taken to remove the source of interference.

DL Interference Detection

A second embodiment of the inventions is concerned with downlink interference detection. The first and second embodiments may be used separately or may be combined.

In some circumstances, typically when not in idle mode, an LTE UE makes CQI reports containing information related to quality assessments of the DL conditions it is experiencing. Each CQI report refers to a CQI "reference resource", which in the frequency domain refers to a group of resource blocks, and in the time domain to 1 subframe. In this document the frequency domain part of a CQI reference resource is referred to as a "CQI sub-band". The embodiment uses these CQI sub-bands as sub divisions of the allocated radio channel.

Although there is variation between UEs in the way CQI is reported for the same radio conditions, the interference detection technique relies on detecting an increase in poor CQI reports, not the absolute values. Often, only a part of a cell will suffer interference, and so only active UEs in that part will report poor CQI.

This embodiment uses existing reports from the UE to the eNodeB, namely CQI, serving cell RSRP and neighbour cell RSRP, so that no new UE functionality is required. The transmission of CQI reports is described above with reference to FIG. 4 and is discussed in the relevant Standards, such as 3GPP 36.213. The embodiment requires a configuration where the CQI reference resource is suitably narrow in the frequency domain so that each is applicable only one CQI sub-band.

According to this embodiment the network (preferably the eNodeB) analyses and stores DL CQI reports reported by UEs, after removing certain CQI reports according to the corresponding values of serving eNodeB RSRP and neighbour eNodeB RSRP reports, as described below.

It is to be expected that in the long term, e.g. a week, the distribution of CQI reports will follow a pattern. When this pattern is not followed, it is an indication that there is a problem, most likely due to unexpected interference.

Overview of the Three Main Stages of the Embodiment

There three main stages are:
1) Maintain long term information and short term information regarding CQI values, with certain CQI reports removed. Store periodic snapshots of the CQI conditions.
2) Periodically, e.g. once per hour, analyse this record and test to see if there may be unexpected interference. If the tests are positive, trigger further action.

3) When further action is triggered:
   a. Trigger O&M alarms
   b. Trigger action on surrounding eNodeBs
   c. If supported, trigger active detection
   d. Otherwise, perform more detailed passive logging for a fixed period
   e. Certain tests are performed Apart from the tests in 3e above, analysis of the various logs is expected to be manual.

Detail of the Three Stages

Stage 1: Maintain Long Term Information and Short Term Information Regarding CQI Values, with Certain CQI Reports Removed. Store Periodic Snapshots of the CQI Conditions.

Briefly, a network node, typically the eNodeB, collates the CQI reports received from all UEs in a cell. Where a UE is at the cell edge (and thus poor CQI is to be expected), where cell edge can be "interference limited" or "coverage limited", the CQI reports are not included in the collation as these reports relate to "Predicable interference". (There are two ways in which a UE reaches the edge of it cell: firstly, it is so far from the antenna that the signal strength is low and there is no other cell for a handover (this is "coverage limited"), and, secondly, the UE is halfway between the serving cell and a neighbour cell, and the neighbour cell is becoming stronger than the serving cell, even though the serving cell signal strength is good (this is "interference limited").) The remaining CQI reports are then grouped, where all members of a group have the same CQI value, CQI sub-band and CQI subframe. For each group, a value of count per unit time (e.g. count per 100 ms) is maintained. There will be one CQI report per active UE per CQI sub-band per CQI subframe. We will refer to this value for the CQI group count per unit time as the "CQI measure".

The unit time period is referred to here as the "CQI measure period", and may be 100 ms—although other values are possible.

Figure 10:
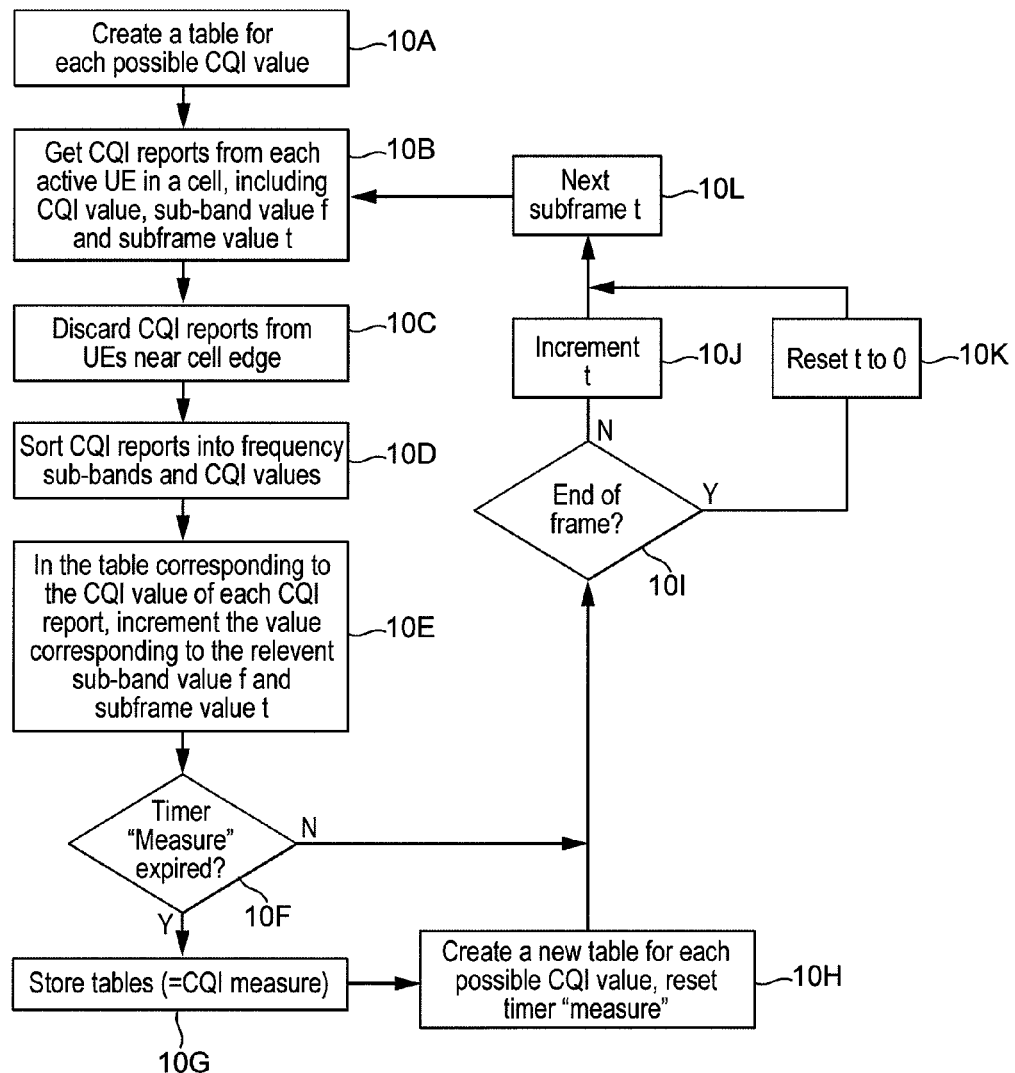
FIG. 10 is a flow chart showing the procedure for storing CQI reports relating to DL conditions a UE is experiencing.

The procedure for selecting and storing CQI reports will now be described in more detail with reference to the flow chart of FIG. 10. The procedure will be performed separately for each cell in order to identify whether each cell is subject to interference. However, the procedure for only one cell will be described here for the sake of brevity.

At step 10A a table is created for each possible CQI value that is possible to be reported from the UEs associated with a particular cell. The possible CQI values are 0 to 15, so there will be 16 tables. The table will have the general form as shown in FIG. 11 of the drawings. When the table is created, the entries corresponding to each sub-band and subframe are set to zero. The table includes a row corresponding to each possible CQI sub-band. The table includes a column corresponding to each subframe within a frame. As described with reference to FIG. 2, a frame has a duration of 10 milliseconds and comprises ten one milliseconds subframes. Therefore, the table will include 10 columns, one corresponding to each possible subframe within the frame.

The "CQI measure period" period may be 100 milliseconds. The CQI data will then be recorded for 10 frames, so the CQI values of each frequency sub-band for each of the 10 subframes will be recorded 10 times in the "CQI measure period". The "CQI measure period" may be set to any suitable value. 100 ms is just an example value.

At step 10A also a timer "measure" is established and is set to zero, where after it is incremented with time.

At step 10B the eNodeB obtains CQI reports from each active mobile device in a cell. The report includes a CQI value, the frequency sub-band (f) and the subframe (t).

At step 10C it is determined whether each CQI report is from a mobile device at the edge of the coverage area provided by the cell. Such CQI reports are then excluded from the interference analysis. The determination of whether a CQI report relates to a mobile terminal at the edge of the coverage area of a cell may be determined in any suitable way. For example, the following two calculations may be performed:

$$RSRP_{serving} - RSRP_{best\ neighbour} < \text{Threshold } A \quad (3)$$

$$RSRP_{serving} < \text{Threshold } B \quad (4)$$

RSRP is reported independently of the CQI report.

According to equation (3) above, the RSRP value between the cell and the mobile terminal is compared to the RSRP value between the mobile terminal and the best neighbouring cell (the values of which will be reported by the UE to the serving cell). If the difference between the RSRP values is below a threshold (threshold A) then this is an indication that the mobile device is near the edge of the coverage area of the serving cell (because the received signal power at the mobile device is only slightly better from the serving cell than from the best neighbouring cell). In addition, in equation (4), the RSRP value of the serving cell is compared to a threshold (threshold B). If the RSRP value of the serving cell is below this threshold, then it is assumed that the UE is at the edge of coverage area of the cell, and the CQI value is ignored. Such CQI values are ignored because they relate to "Predicable interference".

At step 10D the remaining CQI reports are sorted into frequency sub-bands and CQI values. That is, for the current subframe (subframe t), the various CQI reports on each of the mobile terminals served by the cell are sorted into frequency sub-bands and CQI values. A table for the CQI value zero is shown in FIG. 11.

At step 10E for each CQI report, each of the 16 CQI tables is updated according to the number of reports for each CQI value/subframe/subband combination. If, for example, the current subframe is the first subframe of the frame, then appropriate modifications to the "CQI=0" table will be made to the column corresponding to subframe 1 in the table of FIG. 11 for each CQI=0 report. The appropriate entry to the column is to increment the value in the row corresponding to the frequency sub-band (f) to which the CQI report relates. This value is the "CQI measure".

For example, if n mobile devices served by the eNodeB provided a CQI report with a CQI value of zero in subframe 1 for the frequency sub-band 1, the "CQI=0" table is incremented by n in the table location corresponding to subframe 1 and sub-band 1.

At step 10F it is determined whether the timer "measure" has expired. If at step 10F it is determined that the timer "measure" has expired, then at step 10G each of the tables corresponding to the respective CQI values are stored. The 'measure' timer is configurable, and not fixed to the 100 ms value mentioned above.

At step 10H A new table for each possible CQI value is then created for the next CQI measurement period. Also, the timer "measure" is reset to zero and is thereafter incremented with time.

Step 10I is performed after step 10H or after step 10F if at step 10F it is determined that the timer "measure" has not expired (and therefore further measurement reports should be accumulated in the tables for the current CQI measure period).

At step 10I it is determined whether the current subframe (t) is the last subframe in the frame. As mentioned above, there are ten 10 millisecond subframes in each frame. Therefore, if the subframe is the tenth subframe (t=10), then it will be determined at step 10I that the end of the frame has been reached.

If at step 10I it is determined that the end of the frame has not been reached, then at step 10J the subframe value t is incremented.

On the other hand, if at step 10I it is determined that the end of the frame has been reached, then at step 10K the subframe value t is reset to 1.

Step 10L is performed after step 10J or step 10K and corresponds to the occurrence of the next subframe.

The procedure then returns to step 10B, and CQI reports from each active UE of the cell are obtained. Each of these reports includes a CQI value, a frequency sub-value (f) and a subframe value (t), as described above. In this instance, the subframe value t will of course be different. The subsequent steps of the procedure are the performed in the manner described above, so that a succession of CQI measurements are obtained for each CQI value.

After each CQI measurement period, a CQI measure table is stored for each CQI value. Each of these tables will have a format similar to the table of FIG. 11. For example, in the table of FIG. 11, it can be seen that, assuming this is the table for "CQI=0", in the first subframe (subframe 1), the CQI value of zero has been reported by mobile devices in the frequency sub-band 1 on nine occasions. Similarly, it can be seen that in the third subframe (subframe 3), the CQI value of zero has been reported by mobile devices in the frequency sub-band 2 on eight occasions.

For each CQI group, long term information and short term information is calculated.

The long term information can be mean, or an exponential moving average or another average type, using a sliding window for a period of, e.g. 1 week.

The short term information can be mean, or an exponential moving average, or another average type, or the peak value of counts per unit time over a period, using a sliding window for a period of, e.g. 1 hour.

Periodically, e.g. every hour, the calculated long term information for each CQI group is stored. This stored data makes it possible to see long term trends.

The stored information may be reset by command, for example after an interference problem has been resolved, or automatically, for example after a new neighbour relation is created.

Stage 2: Periodically, e.g. Once Per Hour, Analyse this Record and Test to See if there May be Unexpected Interference. If the Tests are Positive, Trigger Further Action.

Various tests are possible to test for unexpected interference, including the following:

Long Term Flatness in the Frequency Domain

The grouping of CQI measures by time domain is not required for this test, so CQI measures can be combined by addition of long term information of CQI measures with the same CQI value and same CQI sub-band (f) but different CQI subframe (t).

FIG. 12 shows a table for the CQI value of zero that combines the CQI measures for all the 10 subframes. For each sub-band (f), the sum of the CQI measures for all the 10 subframes is stored. Such a table is complied for each CQI value.

For each sub-band, the mean of the CQI measures for that sub-band from each table (each table representing a respective 100 ms CQI measurement period) is calculated for a 1 week period. Such mean CQI measures are calculated for each CQI value.

The resulting means can be further combined by CQI value as follows:

$$\text{Combined } CQI \text{ value} = \quad (5)$$
$$a \times (CQI \text{ measure for } CQI = 0) + b \times (CQI \text{ measure for } CQI = 1) +$$
$$c \times (CQI \text{ measure for } CQI = 2) +$$
$$d \times (CQI \text{ measure for } CQI = 3) + \ldots$$

The multipliers for the worst CQI values (those designated by the lower numbers) may be larger than those for the best CQI values, e.g. a=5, b=3, c=1, d=0, etc.

This results in a combined value for the long term average of a representation of the DL quality, per sub-band. The higher the combined value, the lower the quality of the sub-band.

A test is performed to see if the combined value for each sub-band is significantly worse than the average of the corresponding combined values for all sub-bands as follows:

If:

(combined value for sub-band $b$)−(average of combined values for CQI sub-band 1 to $n$)> Threshold $C$ then unexpected interference is suspected.

Long Term Flatness in the Time Domain

An approach the same as for the frequency domain can be made for the time domain, but combining groups with the same CQI subframe and different CQI sub-band instead.

The grouping of CQI measures by frequency domain is not required for this test, so CQI measures can be combined by addition of long term information of CQI measures with the same CQI value and same CQI subframe (t) but different CQI sub-band (f).

FIG. 13 shows a table for the CQI value of zero that combines the CQI measures for all the sub-bands. For each subframe, the sum of the CQI measures for all the sub-bands (f) is stored. Such a table is complied for each CQI value.

For each subframe (t), the mean of the CQI measures for that subframe from each table (each table representing a respective 100 ms CQI measurement period) is calculated for a 1 week period. Such mean CQI measures are calculated for each CQI value.

The resulting means can be further combined by CQI value as follows:

$$\text{Combined } CQI \text{ value} = \quad (6)$$
$$a \times (CQI \text{ measure for } CQI = 0) + b \times (CQI \text{ measure for } CQI = 1) +$$
$$c \times (CQI \text{ measure for } CQI = 2) +$$
$$d \times (CQI \text{ measure for } CQI = 3) + \ldots$$

The multipliers for the worst CQI values (those designated by the lower numbers) may be larger than those for the best CQI values, e.g. a=5, b=3, c=1, d=0, etc.

This results in a combined value for the long term average of a representation of the DL quality, per subframe. The higher the combined value, the lower the quality of the subframe.

A test is performed to see if the combined value for each subframe is significantly worse than the average of the corresponding combined values for all subframe as follows:

If:

(combined value for subframe $c$)−(average of combined values for CQI subframes 1 to $n$)>Threshold $D$ then unexpected interference is suspected.

Compare Short Term Long Term Performance.

The performance over the short term (e.g. 1 hour) and the long term (e.g. 1 week) may be compared to identify interference.

For each CQI group, the long term information is compared with the short term information. If no interference is present, there will be correlation between short term and long term. If interference is present, there will be a difference between short term and long term.

It may be necessary to scale and offset the short term information depending on the differences between how the long term and short term calculations are made.

E.g.:

If:

(long term information for group $Z$)−($m$×short term information for group $Z$)>threshold $E$ then unexpected interference is suspected.

where m is scaling factor

For example, the "long term information" may be the average of the CQI measures for each sub-band as shown in the table of FIG. 12 over 1 week, the "short term information" may be the average of the CQI measures for each sub-band as shown in the table of FIG. 12 over 1 hour. No scaling factor would be required for such averaged long/short term information.

Stage 3: Further Action is Triggered

When tests in stage 2 above indicate that "Non-predicable interference" is suspected the actions below can be triggered. Extra logging and tests can also be triggered by O&M command.

1) Trigger O&M alarms. The network operator is informed that unexpected interference is suspected, and that extra logging has been started. A subsequent alarm is raised when the extra logging is complete. This indicates that manual analysis can start.

2) Trigger extra logging on surrounding eNodeBs, e.g. neighbour eNodeBs, or neighbours plus their neighbours. This aids the localisation (identifying the location) of an interference source. Such logging may be performed according to the principles described in relation to FIG. 9.

3) Active interference detection may be started if it is supported by the network.

Active interference detection is useful when other detection techniques are inconclusive or more detailed information is desired, and may use the following steps:

Time pattern of suspected interference is identified, e.g. continuous, or daily from 1700 to 1730.

Originating eNodeB decides at what time and on which subcarrier(s) to request a quiet period—that is, to request that the subcarrier(s) should not be used for a period. The subcarriers are ranked if there is more than one subcarrier to remain quiet.

Originating eNodeB sends a message to all neighbours with details of the quiet period, namely:

Reference number

CQI sub-band(s) to remain quiet

Start time

Duration per CQI sub-band (eg 500 ms)

Neighbour eNodeB respond with will comply/will not comply/might comply message

Originating eNodeB can cancel, using the reference number, and reapply according to these responses.

At the arranged time, highest ranked CQI sub-band is not allocated by any of the eNodeBs, for the defined duration. Then the next highest ranked CQI sub-band is not allocated, then the next and so on until all the ranked CQI sub-bands have been tested. A special case exists to test all CQI sub-bands, from the highest to the lowest.

The originating eNodeB monitors the correct DL CQI sub-bands at the correct time.

When the process is complete, the "might comply" eNodeBs report compliance or otherwise.

CQI reports from mobiles on the originating eNodeB can be easily analysed to see what CQI values are reported during the quiet time for each sub-band. Any interference here can be confidently attributed to "Non-predicable interference".

This technique requires inter-eNodeB signalling.

4) If active detection is not supported, then start more detailed passive logging for a fixed period.

The long term and short term information described in stage 1 can be logged e.g. every 15 minutes.

This higher rate of logging is not appropriate for the long term, but gives better resolution to aid manual analysis into unexpected interference.

5) Automated tests are performed:

A search is performed for correlation between transmissions on the eNodeB's own DL and interference in the time and frequency domains. This helps to detect interference due to intermodulations at the eNodeB, or poor eNodeB filtering, or other eNodeB problems.

A search is performed for interference at the top and bottom of the frequency band. This would detect a situation where a poor filtering by the user of the adjacent frequency allocation, e.g. a competitor cellular operator, leads to interference.

The embodiments described above are examples only. Many variations to the embodiments are possible, within the scope of the invention. For example, the time periods for collecting or averaging data may be varied.

An UL technique and a DL technique have been described. Some parts of the UL technique could be applied to the DL and vice versa.

The methods, processes, stages, steps, tests and calculations referred to herein may be implemented by any suitable means, such as hardware (e.g. a data processing device) or software (e.g. one or more computer programs).

The hardware may include a general purpose computer that operates according to instructions of one or more computer programs or a data processing apparatus especially adapted to perform the methods, processes, stages, steps, tests and calculations referred to herein.

Computer programs, particularly computer programs on or in a carrier, may be adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

The invention claimed is:

1. A method of identifying interference in a cellular telecommunications network including a plurality of cells, each of which serves a plurality of mobile devices by radio link by using communication resources allocated to each of the mobile devices, the network having a frequency band allocated thereto, and the method including:
    detecting radio quality within the frequency band at at least one of the cells to produce measurement values, wherein the communication resources comprise respective frequency domain subcarriers, wherein the radio quality includes at least uplink received power, the uplink received power being detected for respective periods to produce ones of the measurement values for each of the subcarriers in each of the periods; and
    analyzing selected ones of the measurement values to determine if the selected measurement values indicate the presence of interference, wherein the selected measurement values exclude uplink carriers allocated to each of the mobile devices served by the cell during the period for which the measurement values were taken and exclude subcarriers subject to high interference indication information from neighbor cells, wherein each cell excludes a detected power value that is from the subcarriers.

2. The method of claim 1, wherein the radio quality comprises the uplink received power at the cell.

3. The method of claim 1, wherein the radio quality of the respective subcarriers is detected to produce ones of the measurement values for each of the subcarriers.

4. The method of claim 1, wherein the analyzing step compares the selected measurement value relating to one of the communication resources with a representative value of the selected measurement values relating to others of the communication resources.

5. The method of claim 4, wherein the representative value is the average of the selected measurement values relating to the others of the communication resources.

6. The method of claim 1, wherein the step of detecting radio quality comprises interpreting quality reports relating to downlink radio quality.

7. The method of claim 6, wherein the quality reports comprise CQI reports or RSRP reports.

8. The method of claim 1, wherein the communication resources comprise respective frequency domain sub-bands and wherein the radio quality of the respective sub-bands is detected to produce ones of the measurement values for each of the sub-bands.

9. The method of claim 1, wherein the communication resources comprise respective time domain subframes and wherein the radio quality of the respective subframes is detected to produce ones of the measurement values for each of the subframes.

10. The method of claim 1, wherein the selected measurement values exclude the measurement values relating to the mobile devices served by the cell but located at an edge of the area covered by the cell.

11. The method according to claim 1, wherein the analyzing step includes detecting when there is a change in the frequency of occurrence of a particular one of the quality report values.

12. The method according to claim 1, wherein the cellular telecommunications network is an LTE network, and wherein the cells are each controlled by an eNodeB.

13. The method according to claim 1, including analyzing selected ones of the measurement values to identify the source of the interference.

14. The method according to claim 1, including suspending use of resources to identify the source of the interference.

15. The method according to claim 1, including removing the source of the interference.

16. The method according to claim 1, including detecting radio quality within the frequency band at at least one of the cells to produce measurement values over an extended period of time.

17. The method according to claim 1, wherein the detecting and analyzing steps are performed for a plurality of said cells, the method further comprising comparing the performance of the cells based on the analysis.

18. Apparatus for identifying interference in a cellular telecommunications network including a plurality of cells, each of which serves a plurality of mobile devices by radio link by using communication resources allocated to each of the mobile devices, the network having a frequency band allocated thereto, the apparatus including:
    means operable to detect radio quality within the frequency band at at least one of the cells to produce measurement values, wherein the communication resources comprise respective frequency domain subcarriers, wherein the radio quality includes at least uplink received power, the uplink received power being detected for respective periods to produce ones of the measurement values for each of the subcarriers in each of the periods; and
    means operable to analyze selected ones of the measurement values to determine if the selected measurement values indicate the presence of interference, wherein the selected measurement values exclude uplink subcarriers allocated to each of the mobile devices served by the cell during the period for which the measurement values were taken and exclude subcarriers subject to high interference indication information from neighbor cells, wherein each cell excludes a detected power value that is from the subcarriers.

19. The apparatus of claim 18 operable to perform the method of claim 1.

* * * * *